United States Patent [19]
Burkhardt et al.

[11] 3,829,771
[45] Aug. 13, 1974

[54] DEVICE FOR DISPLAYING MEASURED VALUES

[75] Inventors: Franz Burkhardt, Therwil; Konrad Hammacher, Kaiseraugst, both of Switzerland

[73] Assignee: Hoffmann-La Roche Inc., Nutley, N.J.

[22] Filed: Aug. 12, 1971

[21] Appl. No.: 171,222

[30] Foreign Application Priority Data
Aug. 25, 1970 Switzerland.................. 12636/70

[52] U.S. Cl.................. 324/96, 324/104, 324/115, 350/160 LC
[51] Int. Cl............................................. G01r 13/00
[58] Field of Search ........ 250/72, 83 R; 324/96, 97, 324/99 R, 104, 106, 114, 115; 350/160 LC, 285

[56] References Cited
UNITED STATES PATENTS

| | | | |
|---|---|---|---|
| 2,321,605 | 6/1943 | Keinath............................ | 250/72 X |
| 2,432,874 | 12/1947 | Flint................................. | 250/72 X |
| 2,884,831 | 5/1959 | Rawlings et al.................. | 250/72 X |
| 3,114,836 | 12/1963 | Fergason et al.................. | 250/83 R |
| 3,158,026 | 11/1964 | McGhee......................... | 324/99 R X |
| 3,441,948 | 4/1969 | Ondis............................... | 250/72 X |
| 3,505,804 | 4/1970 | Hofstein................................. | 58/23 |
| 3,524,726 | 8/1970 | DeKoster............................. | 350/160 |
| 3,667,039 | 5/1972 | Garfein et al................... | 350/160 R |
| 3,675,988 | 7/1972 | Soref.................................. | 350/160 |
| 3,689,835 | 9/1972 | Bickford............................ | 350/160 |

Primary Examiner—Ronald L. Wibert
Assistant Examiner—F. L. Evans
Attorney, Agent, or Firm—Samuel L. Welt; Jon S. Saxe; William G. Isgro

[57] ABSTRACT

An apparatus for displaying or indicating the trend or amplitude of fluctuation of an analogically indicated scalar measurement comprising a substance layer on the scale surface of an indicator means, which substance visibly undergoes a reversible alteration with a change in environmental conditions, the reversion of the visible alteration displaying a time-delay when compared with the formation thereof, is described.

11 Claims, 7 Drawing Figures

DEVICE FOR DISPLAYING MEASURED VALUES

BRIEF SUMMARY OF THE INVENTION

The invention relates to an apparatus or device for displaying or indicating the trend or amplitude of fluctuation of an analogical scalar measurement indicated by the pointer means of an indicator means, which apparatus or device comprises a substance layer on a scale surface of the indicator means, disposed in juxtaposition to the scale graduation, which substance visibly undergoes a reversible alteration with a change in the environmental conditions caused by the pointer of the indicator means which comprises a means for altering the environmental conditions of the substance layer at a location corresponding to the pointer position, the reversion of the visible alteration displaying a time-delay as compared with the formation thereof.

DETAILED DESCRIPTION OF THE INVENTION

Figure 1:
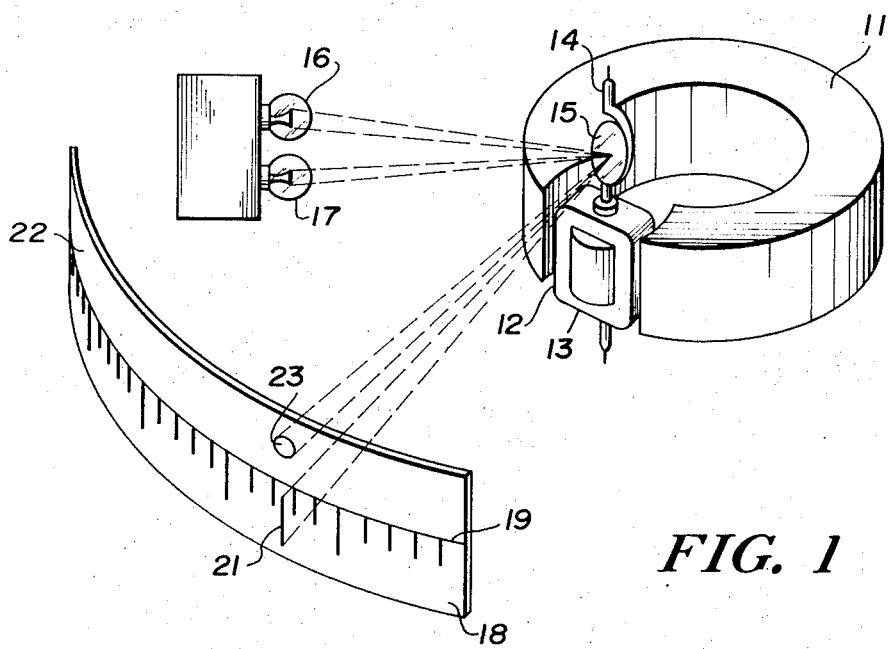

The invention relates to means for displaying or indicating the trend or amplitude of fluctuation of a measured value, particularly an analogically indicated, scalar measurement.

Pointer instruments for indicating scalar measurements give only the actual momentary value of the particular quantity being measured. In addition to the momentary value, however, it is frequently desirable to obtain an indication of the trend or the amplitude of fluctuation of the measurement.

Thus, for example, with indicator instruments associated with patient-monitoring systems, it would be very advantageous if, simultaneously with indication of the momentary value, the observing physician could also distinguish whether, and how strongly, a certain value (for example, the body temperature, the cardiac or respiratory frequency or rate or the blood pressure) has fluctuated or changed in the course of a period preceding the time of observation. This is particularly important since such values can naturally be subject to strong fluctuations and the momentary value often conveys a false picture of the actual state of the patient.

Information on the trend or the amplitude of fluctuation would also be desirable with many other types of measurements, since only in a few cases are measurements of whatever nature absolutely constant.

At the present time, when the variation of a measurement over a period of time is of interest, a recording instrument is generally employed to plot the measurement in relation to time. Apart from the fact that increased expenditure thereby results, it is also not always possible at a brief glance to interpret the course a curve has taken by such a recording instrument. On the contrary, a certain amount of time to study the curve is usually required. However, for example, with indicator instruments associated with a patient-monitoring system, it is not desirable for the physician to spend time on a detailed interpretation of the curve; on the contrary, he should be in possession of the desired information at a glance in order, for example, not to waste time unnecessarily during his examination of the patient or to be able to make immediate decisions during an operation.

Exactly the same situation arises with a multiplicity of measuring procedures in which, for a rapid decision, there must be available information on the trend or the amplitude of fluctuation which is as rapidly comprehensible as possible.

With such measuring procedures, a recording instrument is generally no longer necessary, since frequently the measured data or values are electronically stored or immediately processed. Tables and the like which are printed out are in many cases, therefore, chosen as the form of record, instead of the earlier curves.

It is an object of the present invention to provide means which in combination with an analogically indicating instrument can yield not only information of the momentary value, but also information on the trend of the actual measurement or the amplitude of fluctuation thereof.

According to the present invention there is provided a means for displaying or indicating the trend or the amplitude of fluctuation of an analogically indicated scalar measurement on an indicator instrument, which means comprises a substance layer on a scale surface of the indicator instrument, disposed parallel to the scale graduation, which substance undergoes a visible reversible alteration with a change of the environmental conditions, the pointer of the indicator instrument comprises a component which at a location on the substance layer corresponding to the pointer position locally alters the environmental conditions, the reversion of the visible alteration displaying a time-delay as compared with the formation thereof.

The present invention also provides a method of displaying or indicating the trend or the amplitude of fluctuation of the analogically indicated or displayed scalar measurement of an indicator instrument, which method comprises locally altering the environmental conditions of a substance layer at a location corresponding to the position of the pointer of an indicator instrument, the substance layer being on the scale surface of the indicator instrument, disposed parallel or in juxtaposition to the scale graduation, which substance visibly undergoes a reversible alteration with changes of the environmental conditions, the reversion of the visible alteration displaying a time-delay as compared with the formation thereof.

It is particularly advantageous that the substance layer contain a cholesteric compound which, with certain alterations of the environmental conditions, especially temperature, assumes a crystalline liquid or mesomorphic state.

It will be seen that the invention provides means which enable readings to be made of the momentary values as well as the trend or the amplitude of fluctuation of such values as rapidly as possible and demand no time for interpretation. Further, the apparatus of the invention can be used together with known indicator instruments.

Means in accordance with the invention are, for example, employable with advantage in conjunction with mirror or moving coil galvanometers.

Figure 2:
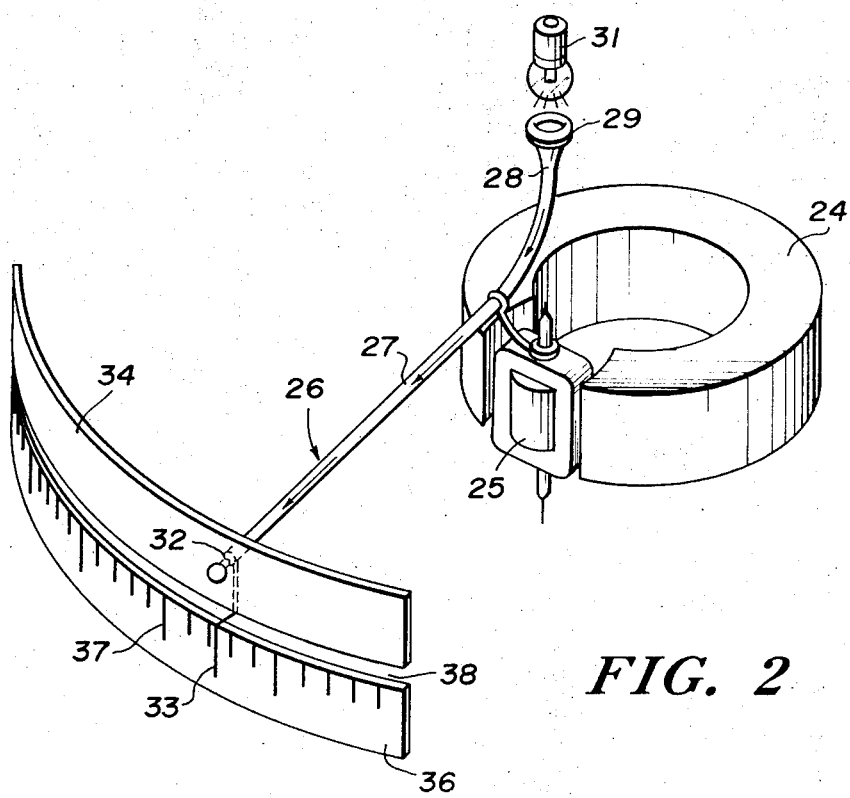
Figure 3:
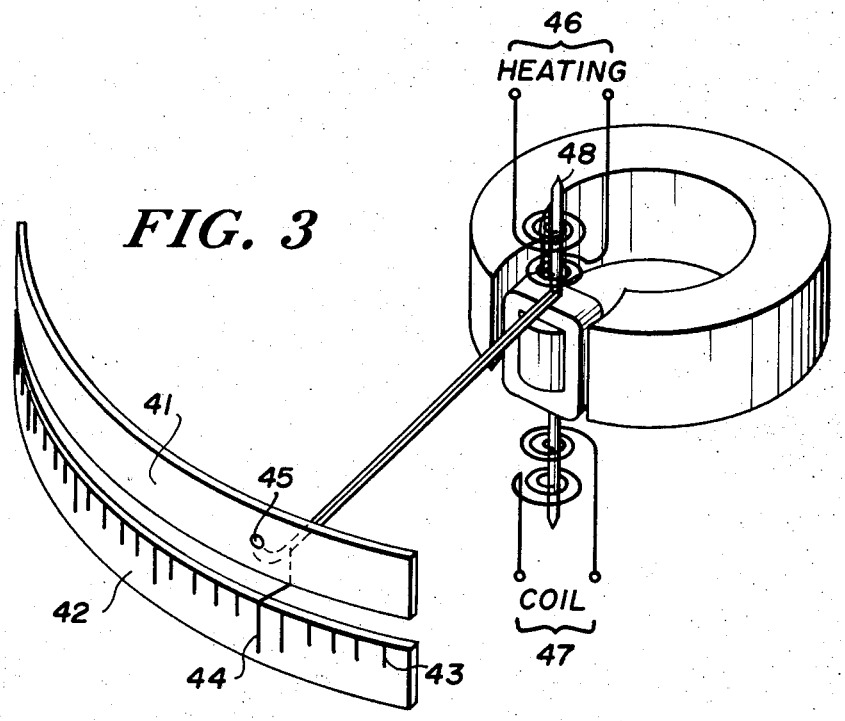
Figure 4:
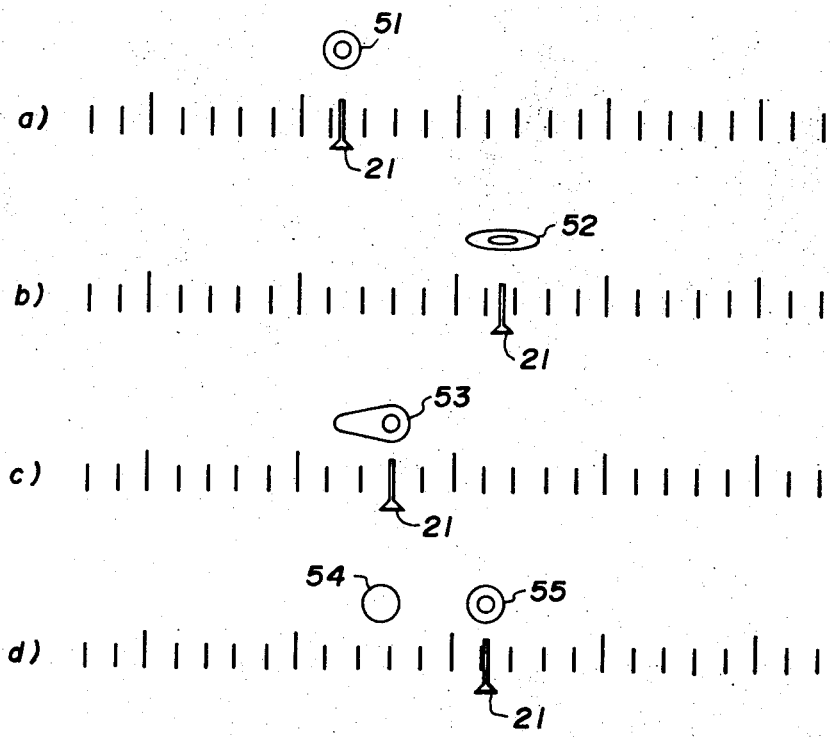

For a better understanding of the present invention and to show how the same may be carried into effect, reference will now be made, by way of example, to the accompanying drawings, in which:

FIG. 1 shows a schematic representation of a mirror galvanometer with means in accordance with the present invention, FIGS. 2 and 3 show schematic representations of two moving coil instruments, each with means in accordance with the present invention, and FIG. 4(a–d) shows a series of different images produced by the indicator instruments of FIGS. 1, 2 and 3.

Referring now to FIG. 1 of the drawings, the mirror galvanometer shown comprises a ring magnet 11, in a cylindrical gap 12 of which a rectangular coil 13 is rotatably suspended in known manner on an axle 14. Above the coil 13, a mirror 15 is so attached to the axle 14 that with flow of current through the coil 13 the mirror is deflected therewith. A light-source 16 is placed at a distance from the mirror and, by means of an elongated incandescent filament directed parallel to the axis of rotation of the coil, generates visible light a beam of which is directed onto the mirror 15 by means of an optical system (not shown). A scale surface 18 with a scale graduation 19 is placed at distance from the mirror 15 in such a way that the beam of light reflected by the mirror 15 impinges on the scale graduation 19.

The scale surface 18 consists of a substantially rectangular screen of transparent material having a semicircular curvature with the axis of rotation 14 as the axis of curvature. The scale graduation 19 is located on the lower half of the scale surface 18 and consists of black graticular markings applied to the inner side of the curve and covered with an elongate thin layer of white, transparent material.

A zone of incidence (linear in shape as a consequence of the longitudinal form of the incandescent filament) of the beam of light on the layer covering the reverse side of the scale graduation 19 is, as a consequence of the transparency of the layer, discernible on the front side of the screen as a bright line 21 parallel to the black scale lines. The bright line 21 indicates the momentary value of the quantity being measured.

The mirror galvanometers of the type utilized with the invention are well known in the art.

Vertically below the light-source 16 is placed a second point-shaped light-source 17 which emits infrared radiation or light with a high content of infrared radiation. A beam of infrared radiation from the light source 17 is directed by means of an optical system (not shown) onto the galvanometer mirror 15 and reflected by this onto the upper half of the scale surface 18. Thereon, the light-source 17 is imaged as a circular point 23.

In the zone of incidence of the infrared radiation beam, the reverse side of the upper half of the scale surface 18 is provided with an elongate thin coating 22 of a temperature-sensitive material. The coating extends longitudinally along the entire length of the scale surface. It is of course to be understood that the coating need only conform to the scale provided on the scale surface 18 and need only be so positioned to be effected by emissions of the light-source. Thus, in another embodiment, the environmental responsive material can be positioned between the transverse edges of the member on which it is supported. This temperature-sensitive material contains a mixture of cholesteric compounds which assume a crystalline liquid state at a temperature in the temperature range which is generated on the screen by the infrared radiation beam.

There is a large number of compounds, the so-called "cholesteric compounds" or liquid crystals, which at a certain temperature range assume a state designated as mesomorphic or crystalline liquid. In this state, the cholesteric compounds possess the striking property of frequency-selective light dispersion, which manifests itself by the substance (colorless outside this temperature range) displaying brilliant colors in the crystalline liquid state.

In the present embodiment, the mixture of cholesteric compounds used is made up of 20 percent cholesteryl propionate and 80 percent cholesteryl pelargonate. All percentages are expressed herein by weight unless otherwise specified. This mixture is colorless below about 40°C. and with increasing temperature colors reddish-brown at about 43°C., green at about 48°C., blue at about 52°C. and is again colorless at temperatures above 56°C.

Since cholesteric compounds such as the ones referred to above are frequently unstable, suitable stabilizers must be added, when required or desired.

With the addition of high-boiling petroleum ether to the mixture referred to above there is prepared a solution with which a scale surface may be coated. After evaporation of the solvent there is obtained the desired temperature-sensitive layer 22.

The temperature-sensitive layer 22 is covered with an infrared-absorbing layer (for example a black lacquer). This covering layer simultaneously prevents the access of air to the sensitive cholesteric compounds and therewith assists prevention of possible oxidation thereof.

The infrared-absorbing layer is covered with an infrared-permeable layer of poor heat conductance. The thickness of the infrared-permeable layer is so chosen that, together with the layer directed towards the observer which forms the screen, a thermal time-constant suitable for the particular application is obtained. These parameters can readily be found empirically for each application.

One, or also both, of the two layers with poor heat conductance responsible for the thermal time-constant may be provided with surface heating in order to raise the temperature thereof above the ambient temperature. This can yield substantial advantages. For example, the dependence of the system on fluctuations of the ambient temperature is diminished. Moreover, since the thermal time-constant depends on the temperature gradient between the point heated by way of the pointer and the adjoining areas of the scale surface, the thermal time-constant can be varied by different degrees of heating up. This possibility of varying the thermal time-constant is of significance as regards the flexibility of use of instruments with indicator means in accordance with the invention.

The infrared-absorbing layer is heated in the zone of incidence of the infrared radiation. The layer lying underneath, which contains the cholesteric compounds, warms up at the same time. With short-term irradiation of about 3 seconds duration, a small, circular zone which exactly corresponds to the zone of incidence of the infrared radiation heats up to about 43°C., whereby there occurs a color transition to red-brown. With more prolonged irradiation, the temperature increases until an equilibrium is established at about 70°C. At the same time, the circular zone changes color, through yellow-green to blue and, in the middle, again becomes colorless. Due to the heat conduction of the coating, there results a radial temperature gradient with which are associated concentric zones in the cholesteric layer having different colors corresponding to the outwardly falling temperatures.

The resulting color images are visible from the front through the transparent material of the scale surface. In the state of rest, the point corresponding to the zone of incidence of the infrared ray is located exactly vertically above the line indicating the momentary value in the zone of the scale graduation 19.

Referring now to FIG. 4, there is given therein a representation of the different indication possibilities, which allow an unequivocal statement to be made regarding the alterations of a measurement which have taken place prior to the time of taking a reading.

Firstly, let it be assumed that a constant measurement exists after switching on the instrument or the light sources. As already described hereinbefore, under such condition in the zone 22 lying above the indicator line 21 the cholesteric mixture is heated to about 43°C. after about 3 seconds, so that it undergoes a transition into the crystalline liquid state and colors red-brown. With a measurement which is constant for a longer period, and therefore receives infrared radiation for a longer period of time, there results the above-described coloration to green and finally blue and simultaneously the formation of concentric color zones 51 as shown in FIG. 4a. From the size of the whole color image and the color of the central color spot, it is possible within certain limits to ascertain whether the measurement has been indicated for a longer or shorter time at the same point of the scale surface.

If it is now assumed that the measurement is not absolutely constant, but is subject to slight fluctuations of small amplitude, there forms an elliptically-shaped color spot 52 with symmetrical color distribution as shown in FIG. 4b. The center of the elliptically-shaped color spot indicates the transient mean value of the quantity measured, while the indicator position 21 corresponds to the momentary value of the quantity measured. From the color of the ellipse it is, for example, possible to ascertain whether the measurement has been subject to the momentary fluctuations for a prolonged time, whether the fluctuations have only appeared shortly before the time of observation, or whether their amplitude has changed shortly before the time of observation.

When the measurement constantly increases, there results an image as shown in FIG. 4c. The indication then consists in a longish asymmetrical color spot 53, the center of which indicates the tendency of the measurement. The length and the color of the color surfaces indicate the rate of change of the measurement.

With a falling measurement there results essentially the same image, but the point which corresponds to the highest temperature lies on the other side of the color spot.

When, finally, the measurement changes abruptly or has changed abruptly before the time of observation, there are formed two (or possibly more) color spots 54, 55 as shown in FIG. 4d.

It has been found that the discernibility and differention of the differently shaped and colored indicator images is very good. Since the individual color images are very easily remembered, critical situations can be immediately comprehended, which is particularly valuable with systems for patient-monitoring in clinics, intensive care units or in an operating theatre. However, the rapid discernibility is also frequently of use with the indication of other than biological measurements.

The invention is clearly not limited to a mirror galvanometer. Furthermore, it is not only possible to heat the temperature-sensitive layer with infrared radiation. Two further embodiments of the present invention will now be described.

Referring now to FIG. 2, there is shown a moving coil instrument with a ring magnet 24 in an air-gap of which a rectangular coil 25 is rotatably mounted in a conventional manner. To the coil 25 is fastened a pointer 26 which in the present case consists of a light-guide. The light-guide consists of a very thin-walled, internally silvered tube 27. The fastening to the rectangular coil is at a distance from the axis of rotation. The tube is extended beyond the fastening and bent vertically upwards so that the vertical shank 28 lies concentric with the axis of rotation. At upper end thereof there is provided an optical system 29. Directly above the optical system 29 is placed an infrared source 31, the radiation of which is deflected by the optical system into the tube 27 forming the pointer 26. The infrared beam emerges from the opposite end of the tube without substantial loss of intensity.

Situated directly opposite the open end 32 of the pointer 26 is a scale part 34, coated with a temperature-sensitive material. Between the two elongate parallel parts 34, 36 of the scale surface there runs a narrow gap 38.

The pointer 26 has an extension 33 which is linked with the tube 27 at the open end 32 thereof and which passes below and parallel to the tube axis so far that it extends through the gap 38 to the front side of the scale surface 34, 36. The extension 33 is bent vertically downwards in front of the half-scale 36 which is provided with a scale graduation 37. The part of the extension 33 which runs vertically accordingly serves to indicate momentary values of the quantity measured.

As with the embodiment described hereinbefore with reference to FIG. 1, the reverse side of the upper part 34 of the scale surface is provided with a layer containing cholesteric compounds which is overlaid with an infrared-absorbing layer and a poorly heat-conducting, infrared-permeable covering layer. The indicator images are similar to those described hereinbefore with reference to FIG. 4.

Referring now to FIG. 3, there is shown a further moving coil galvanometer provided with means in accordance with the invention. The pointer of this instrument is of a similar construction to the pointers of recording instruments in which the recording is carried out on wax matrices. In addition to an offset indicator pointer 44 projecting through a gap between two halves 41 and 42 of a scale surface, which pointer 44 operates in front of the scale graduation 43, the pointer has an upwardly directed extension 45 which ends at a short distance behind the upper half-scale 41. The tip of this extension 45 carries a resistance heating element which can be regarded as a point-shaped or circular heat-source. The current supply for heating is supplied via two wires 46 which are led in the region of axle 48 to the pointer and run along this to the heating element.

Just as is usual with leads 47 for the measurement current, the heating leads 46 are also led in spiral windings to the rotating parts. As with the other embodiments of the invention described hereinabove, the reverse side of the upper, transparent half-scale 41 is coated with a material which contains one or more cholesteric compounds. Once again, this coating is covered with an infrared-absorbing layer and thereover has an infrared-permeable layer of poor heat conductance.

Other embodiments of the present invention will readily be conceived. Thus, for example, the invention is not limited to the reaction of cholesteric compounds to the environmental temperature, but is in principle possible utilizing other alterable environmental conditions which cause a color transition (for example, changes in the electrical field). Furthermore, the invention is not limited to cholesteric compounds, since virtually all substances which undergo a suitable reversible, visible alteration dependent on changes of the environmental conditions are suitable. For example, the use of other crystalline liquid substances, perhaps the nematic compounds, is also possible. To generate a visible alteration, nematic compounds have to be affected by an electrical field. With them, the optical alteration consists not in a color reaction but in a turbidity of an otherwise clear substance.

Besides crystalline liquid substances, other materials are also conceivable for employment in the present invention. For example, the scale surface could also be provided with a fluorescent layer. A UV light pointer would be suitable for activating such a layer. However, because of the particularly easily remembered color reaction the use of cholesteric compounds is to be preferred in many cases.

It will be appreciated that virtually any indicator instrument in the broad sense may be provided with means in accordance with the present invention.

We claim:

1. An apparatus for displaying or indicating the trend or amplitude of fluctuation of an analogical scalar measurement which includes a measuring means, said measuring means comprising a first indicator portion including movable means for indicating a value at a specific point of time, means for moving the movable means, a second indicator portion positioned adjacent the first indicator portion, said second indicator portion comprising a material which visibly undergoes a reversible alteration responsive to certain environmental changes and adapted to indicate such a response over a period of time, the reversion of the visible alteration displaying a time delay as compared with the formation thereof, and means for imparting environmental changes to said material coincident with movement of said movable means.

2. An apparatus in accordance with claim 1, wherein said material visibly undergoes a reversible alteration with alterations of the temperature thereof.

3. An apparatus in accordance with claim 2, wherein said material is formed from at least one cholesteric compound which with particular alterations of the environmental conditions assumes a crystalline liquid or mesomorphic state.

4. An apparatus in accordance with claim 3, wherein said second indicator portion is covered with an infrared-radiation absorbing layer.

5. An apparatus in accordance with claim 3, wherein the means for moving the movable means comprises a mirror galvanometer.

6. An apparatus in accordance with claim 5, wherein the means for imparting environmental changes to the second indicator portion also comprises a light ray displaying a component containing infrared radiation reflected from said mirror.

7. An apparatus in accordance with claim 3, wherein the means for moving the movable means comprises a moving coil galvanometer.

8. An apparatus in accordance with claim 7, wherein the means for imparting environmental changes to the second indicator portion comprises a light ray source displaying an infrared radiation component and a hollow tubular pointer means serving as a guide for said infrared radiation component, one end of said hollow tubular pointer means being disposed adjacent to the second indicator portion and the other end being disposed adjacent to the light ray source.

9. An apparatus in accordance with claim 7, wherein the means for imparting environmental changes to the second indicator portion comprises a heat transmitting pointer provided at an end remote from the second indicator portion with an electrical resistance heater, and having its other end adjacent to the second indicator portion.

10. A method of displaying or indicating the trend or amplitude of fluctuation of an analogical scalar measurement coincidentally with the taking of said analogical scalar measurement which comprises providing a material which visibly undergoes a reversible alteration responsive to environmental changes, the reversion of the visible alteration displaying a time delay as compared with the formation thereof, altering the environmental conditions, and viewing the visible alteration coincidentally with the analogical scalar measurement.

11. A method in accordance with claim 10, wherein the material responsive to environmental changes comprises at least one cholesteric compound which with particular alterations of the environmental conditions assumes a crystalline liquid or mesomorphic state.

* * * * *